United States Patent [19]

Yukawa

[11] Patent Number: 4,649,552
[45] Date of Patent: Mar. 10, 1987

[54] ELECTRONIC PEDOMETER WITH STEP SENSOR IN REMOVABLE INSOLE

[75] Inventor: Kazuhiko Yukawa, Katano, Japan

[73] Assignee: Matsushita Electric Works, Ltd., Kadoma, Japan

[21] Appl. No.: 687,797

[22] Filed: Dec. 31, 1984

[30] Foreign Application Priority Data

Mar. 19, 1984 [JP] Japan .................................. 59-52733
Mar. 24, 1984 [JP] Japan .................................. 59-57028

[51] Int. Cl.$^4$ .......................... G01C 22/00; A43B 5/00
[52] U.S. Cl. ....................................... 377/24; 235/105; 36/132
[58] Field of Search ...................... 377/24; 235/105; 364/561, 410, 560; 36/136

[56] References Cited

U.S. PATENT DOCUMENTS

| | | | |
|---|---|---|---|
| 3,580,083 | 5/1971 | Zipser | 377/24 |
| 4,175,446 | 11/1979 | Crowninshield et al. | 235/105 |
| 4,371,945 | 2/1983 | Karr et al. | 235/105 |
| 4,402,147 | 9/1983 | Wu | 235/105 |
| 4,466,204 | 8/1984 | Wu | 235/105 |
| 4,510,704 | 4/1985 | Johnson | 235/105 |
| 4,571,680 | 2/1986 | Wu | 235/105 |
| 4,578,769 | 3/1986 | Frederick | 364/561 |

FOREIGN PATENT DOCUMENTS

| | | | |
|---|---|---|---|
| 0119009 | 9/1984 | European Pat. Off. | 235/105 |
| 212583 | 7/1983 | Fed. Rep. of Germany | 235/105 |
| 56-153812 | 11/1981 | Japan . | |
| 57-49134 | 10/1982 | Japan . | |

OTHER PUBLICATIONS

"Yup, the Computer Shoe", by Nina Hyde, The Washington Post, Mar. 7, 1985.

Primary Examiner—John S. Heyman
Assistant Examiner—Karl Ohralik
Attorney, Agent, or Firm—Armstrong, Nikaido, Marmelstein & Kubovcik

[57] ABSTRACT

An electronic pedometer for use on a footwear is disclosed. The pedometer comprises a step sensor carried by the footwear for sensing each step that the user takes to provide an output indicative thereof. Connected to the sensor is a mount base which is secured to the footwear and has thereon a first terminal electrically connected to the step sensor. A counter, which is detachably mounted on the mount base, has therein various electronic components forming a computing circuit and includes a display section. The counter is provided with a second terminal which comes into electrical connection with the first terminal on the mount base when mounted thereon so that the computing circuit receives the outputs from the sensor to compute based thereupon the number of steps taken and the distance travelled by the user. The resulting measurements of the computing circuit are visually indicated on the display section of the counter. Thus, the counter including the electronic components can be alone detached from the footwear while the mount base thereof and the sensor remain attached thereto, eliminating the troublesome procedure to remove the base mount secured to the footwear when the footwear is required to be washed as protecting the electronic components of the counter from being damaged during that washing. Accordingly, the convenience of using the pedometer on the footwear is greatly enhanced, leading to a widespread use of the pedometer.

3 Claims, 12 Drawing Figures

ELECTRONIC PEDOMETER WITH STEP SENSOR IN REMOVABLE INSOLE

BACKGROUND OF THE INVENTION

1. Field of the Invention

The present invention is directed to an electronic pedometer, and more particularly to an electronic pedometer adapted to be fitted on a footwear of the user.

2. Information Disclosure Statement

Electronic pedometers adapted on the footwear are known, for example, as disclosed in Japanese utility model KoKoKu publication No. 57-49134 published on Oct. 27, 1982 and Japanese utility model KOKAI publication No. 56-153812 published on Nov. 17, 1981. The former publication discloses a shoe with an electronic pedometer which is composed of a strain transducer or piezoelectric element utilized as a step sensor which produces an output in response to each step taken by the user and a counter receiving the outputs of the transducer for incrementally count the number of steps taken by the user. Electronic components except for the transducer necessary for the operation of the pedometer are incorporated within the case of the counter which is secured on the instep of the shoe by means of a strap extending therefrom and is electrically connected through wires in the strap to the transducer mounted in the outsole of the shoe near the toe thereof. The later publication discloses the like construction except that the transducer is located on the insole of the shoe at the heel thereof and is electrically connected through wires to the counter secured on the instep thereof by means of strap. In these prior pedometers, however, the counter having the electronic components should be removed from the shoe each time the shoe is required to be washed or cleaned for the purpose of protecting the electronic components in the counter from being damaged during the washing or cleansing. And the removal of the counter can be done by unfastening the strap and at the same time disconnecting the transducer therefrom. These unfastening and the subsequent refastening procedures render the prior pedometers to be very inconvenient and troublesome for repeated use on the shoe. Such inconvenience involved in unfastening and refastening procedures will be the cause of failing to enhance the widespread use of the above prior instruments.

SUMMARY OF THE INVENTION

The present invention has been accomplished in view of the above and provides an electronic pedometer of improved practical utility for use on a footwear. The pedometer of the present invention comprises a step sensor for sensing each step that the foot fitted with the footwear makes during a walking or running motion of the user to provide an output indicative thereof. A mount base connected to said step sensor has means by which it is secured onto the footwear and has thereon a first terminal in electrical connection with the sensor. Detachably mounted on said mount base is an electronic counter which encloses various electronic components forming a computing circuit and is provided with a second terminal. Said second terminal is arranged to come into electrical contact with said first terminal on the mount base when the counter is mounted thereon such that the computing circuit is electrically connected to the step sensor for receiving the outputs therefrom, whereby the circuit responds to compute the number of steps taken by the user and the distance travelled thereby. Also included in the counter is a display section which visually indicates the resulting measurements by the circuit. With this arrangement, the counter enclosing the electronic components can be alone removed from the footwear while the mount base thereof remains attached to the footwear such that the footwear can be washed or cleansed without damaging the electronic components in the counter and without requiring troublesome and annoying procedure to unfasten the mount base from the footwear to which it has been secured, whereby facilitating the washing or cleansing of the footwear as protecting the the counter, which enhances the convenience of using the pedometer on the footwear. Also, the electrical connection between the counter and the sensor can be done simultaneously at the time of attaching the counter to the base mount so as to thereby facilitate the manipulation of remounting the counter after the washing or cleansing of the footwear.

Accordingly, it is a primary object of the present invention to provide an electronic pedometer for use on a footwear which allows the counter enclosing the electronic components to be alone removed from the footwear while leaving the mount base thereof to remain attached to the footwear, giving rise to a very useful arrangement suitable for repeated use on the footwear and therefore leads to a widespread use of the pedometer for use on the footwear.

Said mount base is connected to the step sensor by means of a flexible cable. The flexible cable can be easily deformed to fit the contour of the footwear so that it cannot irritate the foot in the footwear. Included in the counter is a battery for giving an operation power thereto, such that the replacement of the battery can be readily done also without requiring the troublesome procedure to detach the mount base and the sensor from the footwear. In a preferred embodiment, the pedometer of the present invention is designed to fit on a shoe having an insole. Said step sensor is carried by the insole so that the sensor can be readily added in the form of the insole to the shoe or removed therefrom as required. In other words, the pedometer of the present invention can be easily applied to any shoe only by replacing or adding the insole with the step sensor, enabling the easy conversion of any existing shoe into a pedometer shoe without resorting to any complicated modification of the existing shoe.

It is therefore another object of the present invention to provide an electronic pedometer capable of being readily adapted to any shoe with which the user prefers to measure his walking or running behavior.

In another preferred embodiment of the present invention which discloses an electronic pedometer for use on a footwear having an instep, both the counter and the step sensor are mounted on the instep in such a closely adjacent relationship as to eliminate a wiring extending inside of or through the thickness of the footwear for electrical connection therebetween. With this result, the counter, the mount base thereof, and the sensor can be assembled into one compact but separable unit which can be easily adapted on the footwear at a time only by utilizing the instep thereof as a support for carrying the unit and not requiring any other portions than the instep. Thus, all the components of the pedometer can be concentrated on the instep and not extend into the inside of the footwear so that they cannot irritate the foot in the footwear, which would be seen if the sensor and the wiring thereof be located inside the footwear as in the prior pedometers. It is therefore a further object of the present invention to provide an electronic pedometer for use on a footwear which is less bulky and readily mounted on the footwear without impairing pleasant wearing fitness of the footwear.

These and other advantages of the present invention will be apparent from the following detailed description of the preferred embodiments when taken in conjunction with the accompanying drawings.

DESCRIPTION OF THE PREFERRED EMBODIMENTS

First embodiment <FIGS. 1 through 5>

Figure 1:
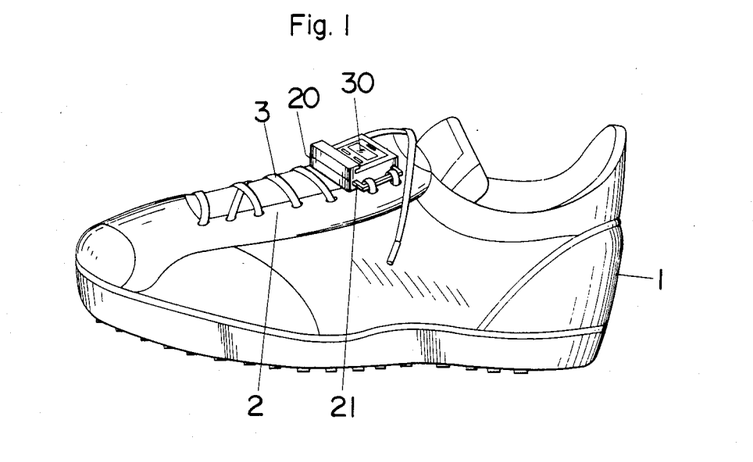
FIG. 1 is a perspective view of an electronic pedometer as attached to a shoe in accordance with a first preferred embodiment of the present invention.
Figure 2:
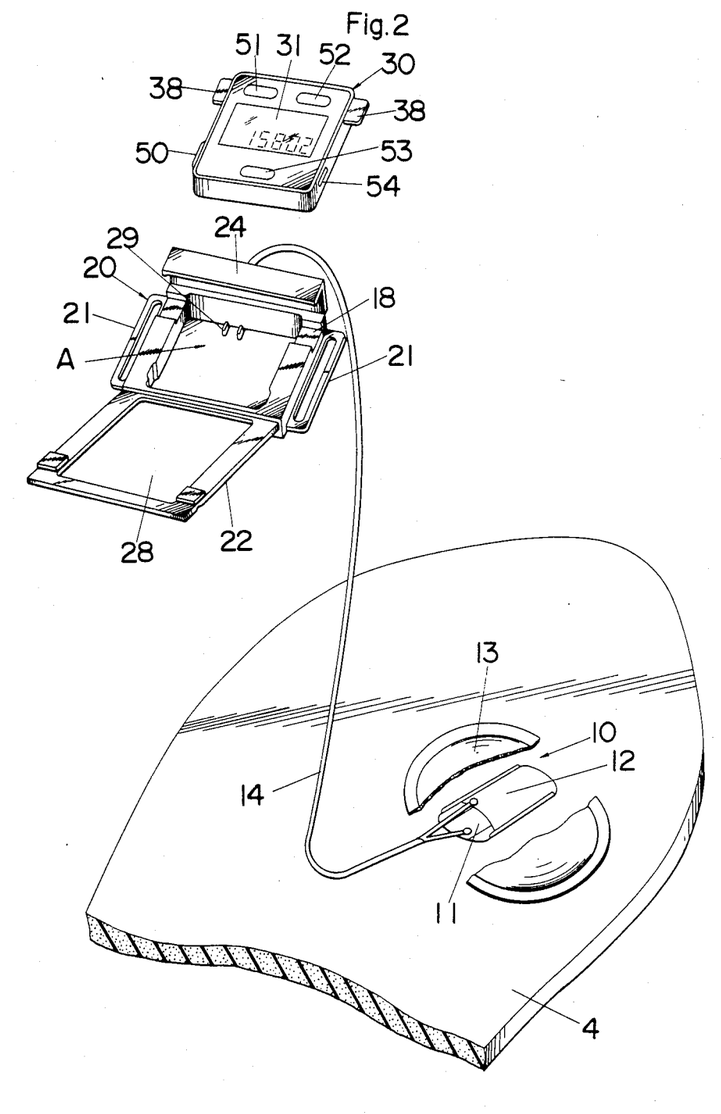
FIG. 2 is a perspective view of the above pedometer with a counter detached from a complementary mount base connected to a step sensor.

Referring firstly to FIG. 1, there is disclosed an electronic pedometer adapted for used on a footwear in accordance with a first preferred embodiment of the present invention. In the present and the other embodiments hereinafter described, the pedometers are designed to be fitted on a sneaker 1 or the like running shoe having a shoelace 3 on the instep 2 thereof. As shown in FIG. 2, the pedometer of the present invention comprises a step sensor 10, an electronic counter 30 electrically connected thereto, and a mount base 20 to be secured on the instep 2 of the shoe 1 for supporting thereon the counter 30. The step sensor 10 is a stride-actuated normally open switch composed of a fixed contact plate 11 and a movable contact spring 12 of convexo-concave configuration having its periphery clamped through an insulative material (not shown) together with the periphery of the fixed contact plate 11 such that the remaining portion of the contact spring 12 comes into momentary engagement with the fixed contact plate 11 when it is subjected to a compressive load. The switch or sensor 10 is sealed by a water-resistant film 13 and is fixed to the undersurface of a removable insole 4 of the shoe 1 at the area in the vicinity of the ball of the big toe and the root of the second toe of the user's foot. The switch 10 thus constructed closes when the user has one's foot on the ground to apply the compressive force to the contact spring 12, thereby providing an output indicative of each step that the user takes with one's foot wearing the shoe 1. A flexible cable 14 of rather flat configuration extends from the switch or sensor 10 with its wires connected respectively to the fixed contact plate 11 and the movable contact spring 11 and curves along the inside of the shoe 1 to be connected to the mount base 20 to be mounted on the instep 2 of the shoe 1.

The mount base 20 is made of plastic material to be molded into a box-like configuration having integral buckles 21 on the opposite sides thereof. It is these buckles 21 that provide fastening means by which the mount base 20 is secured on the instep 2 together with the electronic counter 30 carried thereby. That is, the mount base 20 is secured on the instep 2 by passing the shoelace 3 through the buckles 21. Also molded with the mount base 20 are a lid 22 and a flap 24 integrally connected thereto by respective webs 23 and 25 which provides natural or living hinges permitting pivotal movement of the lid 22 and the flap 24 from open positions shown in FIG. 2 to closed or collapsed positions shown in FIG. 4, respectively. In the collapsed positions, latches 26 on the edge of the flap 23 snap into cooperative grooves 27 in the lid 22 for retaining the lid 22 in this position. Said electronic counter 30 mounted on a bottom wall of the mount base 20 is covered by the lid 22 so as to be held between the mount base 20 and the lid 22. Said lid 22 is provided with a window 28 through which the major part including a display section 31 of the counter 30 can be viewed. Provided on the bottom wall of the mount base 20 is a first terminal 29 comprising a pair of electrodes connected to said switch or sensor 10 by the cable 14, said electrodes being partly molded in the bottom wall of the mount base 20 to have their upper portions projecting thereon for engagement with complementary members forming a second terminal 36 belonging to the counter 30.

Figure 5:
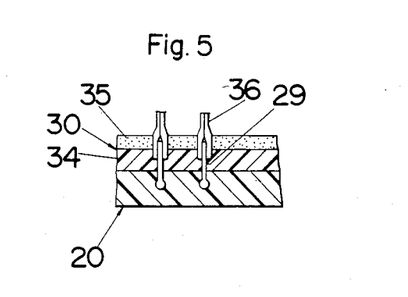
FIG. 5 is a cross section corresponding to the portion indicated at A of FIG. 2.
Figure 6:
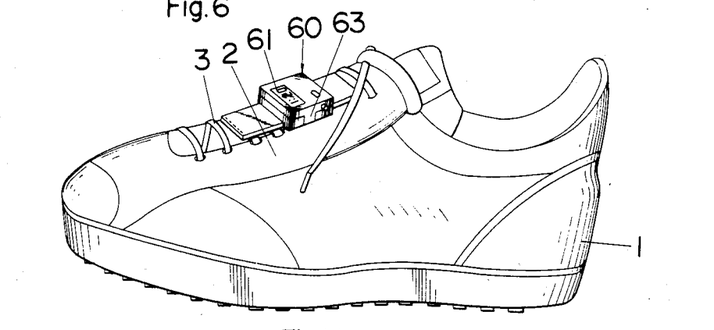
FIG. 6 is a perspective view of an electronic pedometer as attached to a shoe in accordance with a second embodiment of the present invention.

Said electronic counter 30 comprises a casing 32 enclosing various electronic components forming a computing circuit which receives the outputs from the sensor 10 to compute based thereupon the number of steps taken by the user and the distance covered thereby and as well forming said display section 31 visually indicating the resulting measurements, or selectively indicating the number of steps or the distance covered. Also incorporated in the counter 30 is a so-called button battery 37 powering the computing circuit and the display section 31. The casing 32 includes a flattened top case 33 and a bottom plate 34 which are assembled together with a sealing ring 35 interposed therebetween into a water-tight construction. Provided on the bottom plate 34 is said second terminal 36 forming the input end of said computing circuit and comprises a pair of sockets, each of which is in electrical connection with each of said electrodes of the first terminal 29 on the mount base 20 when the counter 30 is mounted on the base 20 for electrical connection between the sensor 10 and the counter 30. Each of the sockets extends through said sealing ring 35 and the bottom plate 34 for engagement with each of electrodes of the first terminal 29, as best shown in FIG. 5. In this connection, the casing 32 of the counter 30 is formed on the opposite sides thereof with ears 38 which are intimately received in complementary slots 18 in the mount base 20 for position correct connection between the first and second terminals 29 and 36.

Figure 3:
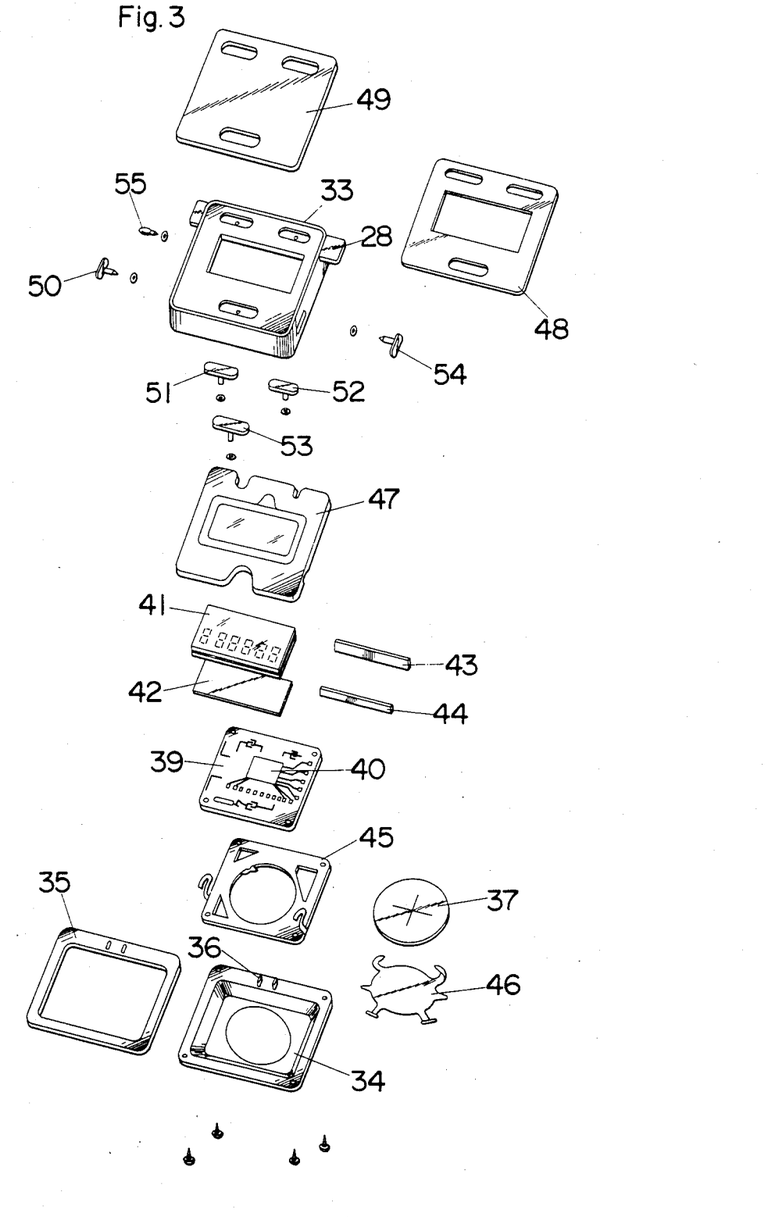
FIG. 3 is an exploded view in perspective representation of the above counter.
Figure 4:
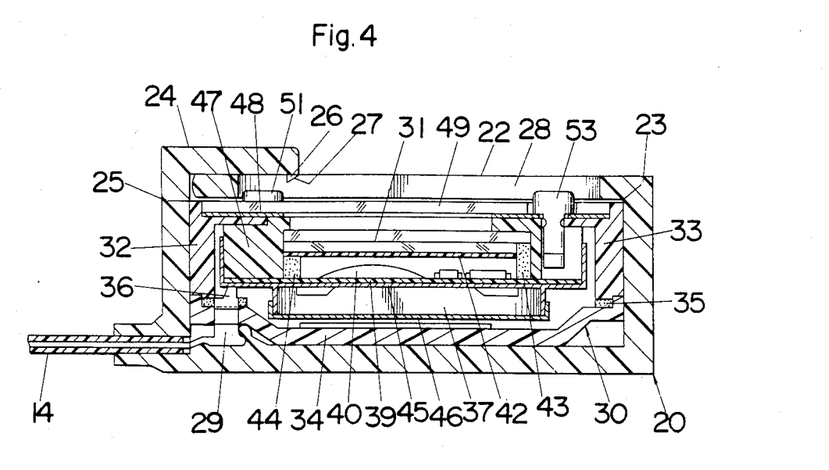
FIG. 4 is a longitudinal section of the above counter.

Included in said electronic components are a printed circuit board 39 mounting thereon a one-chip microcomputer 40 executing necessary operations in accordance with a program stored therein and a liquid crystal display (LCD) 41 forming said display section 31, as shown in FIG. 3. The LCD 41 backed with a reflection plate 42 is supported on the printed circuit board 39 by means of spaced members, one being a rubber electrode 43 for electrical connection therebetween and the other a dummy rubber 44. Said battery 37 is retained by a combination holder 45 and a contact plate 46 and is electrically connected to the printed circuit board 39 therethrough. A mask frame 47 having an aperture corresponding to an opening for the LCD 51 in the top case 33 is received within the top case 33 and holds therein the above parts in correct positions. Said top case 33 is formed at its upper face with a recess receiving therein a name plate 48 and a transparent cover 49.

The above microcomputer 40 is programmed to count the number of steps from the outputs of the sensor 10, to multiply the total number of steps by twice a constant representative of the step-length of a particular user for giving the total distance covered, and to count the time elapsed in the course of walking or running by the user. The resulting measurements of the above operations by the microcomputer 40 are selectively indicated on the display section 31. For selection among the above modes and for setting of the data or constant to be entered for representing the step-length of the particular user and the present time, the counter 30 is provided with several buttons each accessible from the outside. Button 50 is for entering a constant for the step-length, the present time, and the preset distance, button 51 for selection between the indication of the number of steps taken and the indication of the elapsed time causing an indication of the elapsed time as long as the button 51 is held down, button 52 for selection between the indication of the number of steps and the total distance covered causing an indication of the total distance as long as the button 52 is held down, button 53 for starting and stopping the counting of time, button 54 is for present time setting, and button 55 is for resetting.

When the shoe 1 requires to be washed after a number of repeated use, the counter 30 including the various electrical components can be alone removed from the mount base 20 or the shoe 1 for protecting the electronic components in the counter 30 from being damaged during the washing, while leaving the mount base 20 and the sensor 10 to remain attached to the shoe 1. Accordingly, the washing can be done without requiring annoyance procedure of unfastening the mount base 20 which is to be firmly secured to the instep 2 of the shoe 1 by being fastened to the shoelace 3, thereby enhancing the practical utility of the pedometer for use on the shoe 1 which should require frequent washing treatments.

Second embodiment <FIGS. 6 to 10>

Figure 7:
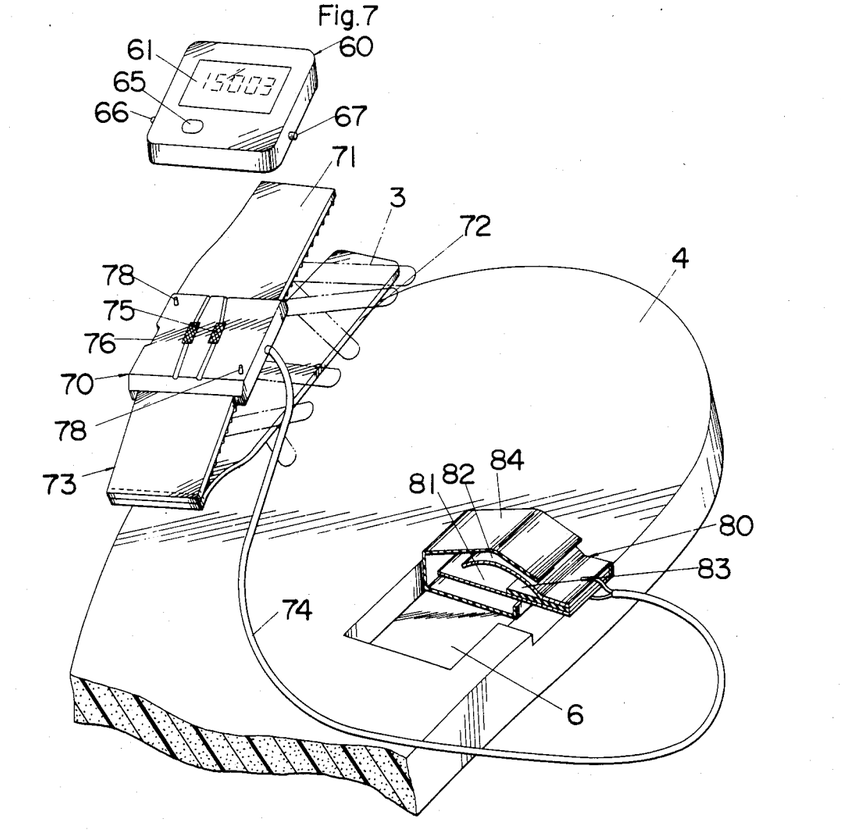
FIG. 7 is a perspective view partially in cutaway representation of the pedometer of the above second embodiment.
Figure 8:
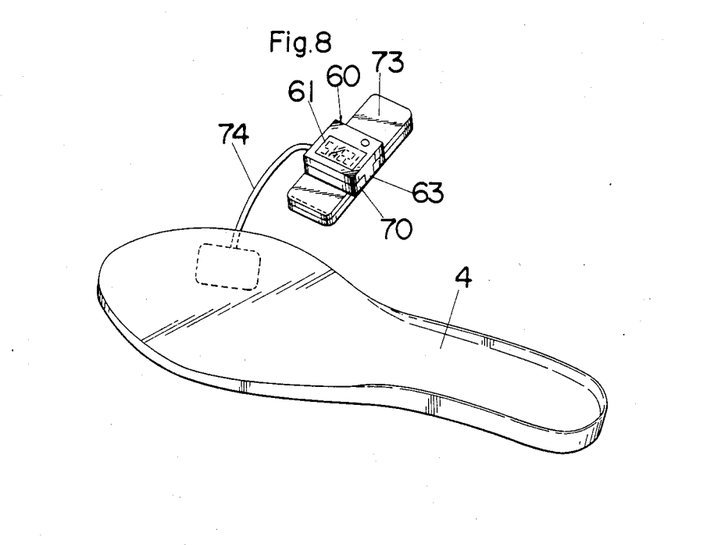
FIG. 8 is a schematic view of the above pedometer including an insole in which a step sensor is mounted.
Figure 9:
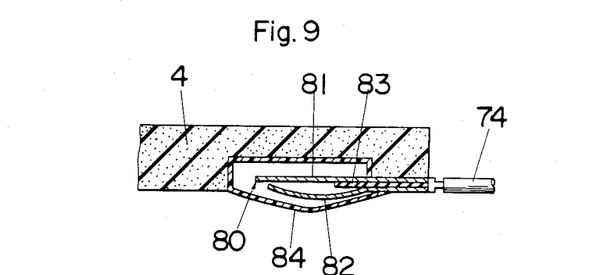
FIG. 9 is a sectional view of the above step sensor.

A pedometer in this embodiment includes an electronic counter 60 and a mount base 70 on which the counter 60 is detachably supported. The counter 60 is of the like construction as in the above embodiment to have a display section 61 and plural buttons 65–67, by the manipulation of which the selection of the function modes of the circuit in the counter 60 is made. The mount base 70 is of a platform configuration having a fastening band 73 by which it is secured on the instep 2 of the shoe 1. The fastening band 73 utilizes the combination of hook-and-pile fabric widely known under the trademark "Velcro" and comprises first and second tapes 71 adhesively secured to one another and readily detachable from one another. The first tape 71 extends through the mount base 70 to be substantially integral therewith and has on the underside thereof hooks. The second tape 72 is stitched at its one longitudinal end to the first tape 71 and has thereon piles engageable with the hooks. Thus, the mount base 70 can be secured on the instep 2 by sandwiching the shoelace 3 between the two tapes 71 and 72, as shown in FIG. 7.

Figure 10:
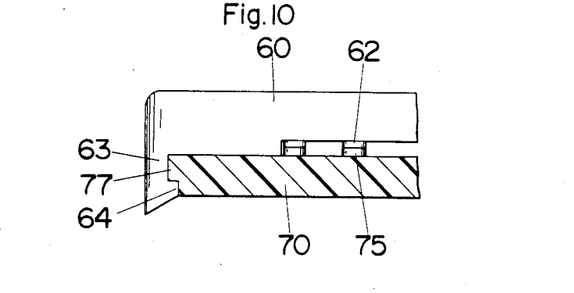
FIG. 10 is a sectional view illustrating the electrical connection between an electronic counter and a complementary mount base of the above pedometer.

The mount base 70 is connected by a cable 74 to the like step sensor 80 as in the above embodiment and is provided thereon with a first terminal 75 which is electrically connected to the sensor 80. The first terminal 75 comprises a pair of electrodes arranged to be in electrical contact with corresponding terminal members constituting a second terminal 62 on the bottom of the counter 60 when it is mounted on the base 70, as shown in FIG. 10. The sensor 80 is a step-actuating switch including a pair of contact members 81 and 82 held together at one end with an insulation sheet 83 therebetween. These contact members are arranged likewise in the previous embodiment so as to close momentary in response to a compressive load applied thereto when the foot of the user hits the ground. The sensor 80 thus constructed is sealed in an flexible enclosure 84 of insulative plastic film and is received in a recess 6 in the insole 4 with one part projecting on the surface thereof for contacting engagement with the foot of the user.

A latch arm 63 depends from the counter 60 to be snappedly received in a notch 76 formed in one side of the mount base 70 so that the counter 60 is detachably mounted thereon with a projection 64 on the lower end of the arm 63 latched to a shoulder 77 on the bottom of the notch 76, as shown in FIG. 10. Also formed on the mount base 70 is a pair of diagonally spaced studs 78 which fit in complementary holes (not shown) in the bottom of the counter 60 for correctly positioning of the counter 60 on the base 70.

Figure 11:
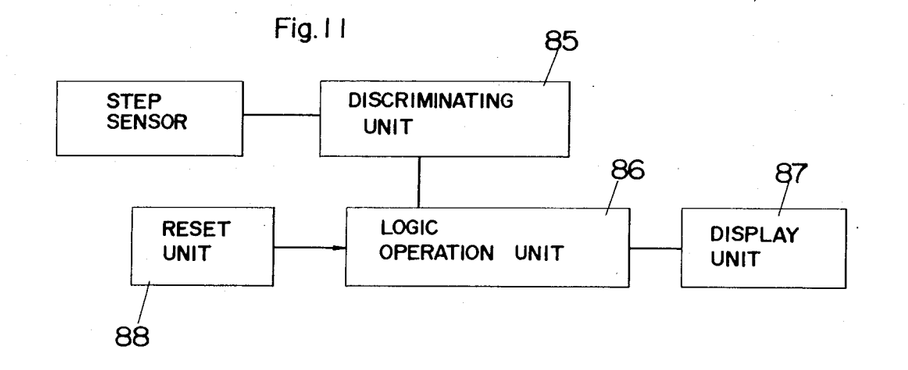
FIG. 11 is a block diagram schematically illustrating the operation of the above pedometer.
Figure 12:
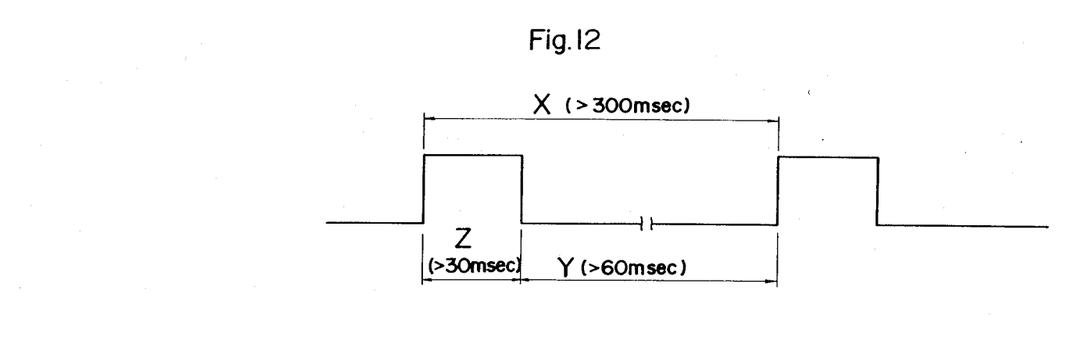
FIG. 12 is a waveform chart illustrating a particular waveform seen in an computing circuit of the above pedometer.

FIG. 11 shows in greatly schematic representation a functional block diagram of the electronic counter common to the embodiments disclosed herein. The outputs from the step sensor is fed through a discriminating unit 85 to a logical operation unit 86 where they are processed to give the number of steps taken and the total distance travelled, while the logical operation unit 86 controls a display unit 87 to selectively give the incremental indication of the number of steps or the distance in accordance with the instruction entered by the user. A reset unit 88 is coupled to the logical operation unit 86 for giving the instruction of clearing the indication at the display unit 87. Said discrimination unit 85 is so designed as to ignore possible noises or irregular pulses emanating from the chattering of the contacts in the sensor, a jamming radio source, or any other unknown cause for passing only the valid outputs indicative of the actual steps to the logical operation unit 86. For this purpose, the discrimination unit 85 is arranged to recognize the outputs fed from the sensor as valid outputs indicative of actual steps only when the following three requirements are satisfied. The first requirement is that the interval X, as shown in FIG. 12, between the rise times of the output and the succeeding output should be more than 200 msec. The second requirement is that the off-time interval Y between the adjacent outputs should be more than 60 msec, and the third requirement is that the on-time interval Z per one output continues more than 30 msec. The above values are decided empirically with due consideration to the behavior of walking and running, and are well distinctive of the actual step from possible noises or the like, whereby the counter of the present invention can accurately count the number of actual steps and the exact distance travelled. In fact, even in the case of spot-running which is thought to exhibit a minimum time interval or to be done at a cycle of minimum time among all the modes of walking and running, the runner cannot have his foot touching at the time interval of not sooner than 200 msec, for example.

What is claimed is:

1. An electronic pedometer adapted to be fitted on a footwear which comprises:
   a step sensor for sensing each step that the foot fitted with the footwear makes during a walking or running motion of the user to provide an output indicative thereof;
   a removable insole having said step sensor sealed thereto and said removable insole being insertable into the footwear, said insole being formed separately from the footwear;
   a mount base separately formed from the footwear and having means by which it is secured to the footwear and having thereon a first terminal which is electrically connected to said step sensor, said first terminal being wires to said step sensor of said insole by means of a flexible cable; and
   an electronic counter having therein components forming a computing circuit, said counter being detachably mounted on said mount base and having a second terminal which is in electrical connection with said first terminal when mounted on the mount base so that the computing circuit is electrically connected to said step sensor to receive the outputs therefrom for computing, based upon the outputs, the number of steps taken, and said electronic counter including a display section indicating the resulting measurements by the circuit.

2. The electronic pedometer as set forth in claim 1, wherein said mount base is provided with a lid by means of which the electronic counter is held in place within the mount base, said lid having therein a window through which said display section is viewed.

3. The electronic pedometer as set forth in claim 1, wherein said electronic counter is self-powered counter incorporating therein a battery for operating the computing circuit.

* * * * *